United States Patent [19]

Rajanathan et al.

[11] Patent Number: 5,732,938
[45] Date of Patent: Mar. 31, 1998

[54] ACTUATION APPARATUS

[75] Inventors: Chinniah B. Rajanathan; Zhanwei Shi, both of Dundee, Scotland

[73] Assignee: NCR Corporation, Dayton, Ohio

[21] Appl. No.: 589,439

[22] Filed: Jan. 22, 1996

[30] Foreign Application Priority Data

Jun. 15, 1995 [GB] United Kingdom .................. 9512146

[51] Int. Cl.$^6$ ..................................................... B25B 1/06
[52] U.S. Cl. ............................. 269/216; 269/8; 269/329
[58] Field of Search ............................. 269/8, 58, 216, 269/329

[56] References Cited

U.S. PATENT DOCUMENTS

| 1,226,697 | 5/1917 | Rinsche | 269/216 |
| 2,381,458 | 8/1945 | Meister | 269/8 |
| 2,967,302 | 1/1961 | Loveless | 269/8 |

FOREIGN PATENT DOCUMENTS

| 2416215 | 10/1974 | Germany | 269/216 |
| 269533 | 11/1990 | Japan | 269/8 |
| 776853 | 11/1980 | U.S.S.R. | 269/8 |
| 860368 | 8/1981 | U.S.S.R. | 269/58 |

OTHER PUBLICATIONS

Patent Abstracts of Japan, vol. 014, No. 041 (E-0879), 25 Jan. 1990 & JP-A-01 274406 (Shindengen Electric Mfg Co Ltd), 2 Nov. 1989.

Patent Abstracts of Japan, vol. 011, No. 357 (C-458), 20 Nov. 1987 & JP-A-62 127387 (Ishikawajima Harima Heavy Ind Co Ltd), 9 Jun. 1987.

Patent Abstracts of Japan, vol. 015, No. 131 (P-1186), 29 Mar. 1991 & JP-A-03 013802 9 (Furukawa Electric Co Ltd:The), 22 Jan. 1991.

Primary Examiner—Robert C. Watson
Attorney, Agent, or Firm—Michael Chan

[57] ABSTRACT

An actuation apparatus for positioning a workpiece includes a movable electrically conductive member connectable to said workpiece, first electromagnetic actuating means energizable by a first AC voltage source to produce a first force acting on said movable member in a first direction, and second electromagnetic actuating means energizable by a second AC voltage source to produce a second force acting on said movable member in a second direction opposite to said first direction. The forces produced on the movable member by the actuating means are brought about by the interaction of eddy currents induced in the movable member with the magnetic fields produced by the first and second actuating means. The movable member can be moved to a desired position by appropriate energization of the first and second actuating means such that the first and second forces are equal at the desired position.

11 Claims, 5 Drawing Sheets

ACTUATION APPARATUS

BACKGROUND OF THE INVENTION

The present invention relates to an actuation apparatus for positioning a workpiece, and in particular to an electromagnetic actuation apparatus.

A well known actuation apparatus uses a solenoid and an iron armature connectable to the workpiece to be moved. DC Current flow in electrically conductive windings in the solenoid produces a magnetic field which moves the iron armature to a fixed "on" position. As the armature moves, so does the workpiece. When the current flow stops the iron armature is returned to its home or "off" position by a spring. With this actuation device, it is only possible to move the workpiece between two positions depending upon whether the solenoid is "on" or "off".

In addition, as the windings have a large electrical inductance the speed of response of the device is severely limited, as the time constant for the device is proportional to the self inductance of the windings.

SUMMARY OF THE INVENTION

It is an object of the present invention to provide an actuation device having enhanced flexibility and a fast response time.

According to one aspect of the present invention there is provided an actuation apparatus for positioning a workpiece; including a movable member connectable to said workpiece, and electromagnetic actuating means energizable to produce a force on said movable member in a predetermined direction, characterized in that said movable member is of electrically conducting material, and in that said actuating means is connected to an AC voltage supply, said force being caused by the interaction of eddy currents induced in said movable member with the magnetic field produced by said actuating means.

According to another aspect of the present invention there is provided an actuation apparatus for positioning a workpiece, including a movable member connectable to said workpiece, and first electromagnetic actuating means energizable to produce a first force on said movable member in a first direction, characterized by second electromagnetic actuating means energizable to provide a second force acting on said movable member in a second direction opposite to said first direction, the forces produced on said movable member by energization of said first and second actuating means being dependent on the position of said movable member relative to said first and second actuating means, whereby said movable member may be moved to a desired position by appropriate energization of said first and second actuating means such that said first and second forces are equal at said desired position.

The actuation apparatus may comprise two induction coils energizable by AC voltage supplies and electromagnetically coupled to an electrically conductive movable member, the magnetic fields producing eddy currents in the movable member.

Because the currents induced in the movable member reduce the effective self inductance of the coils to virtually zero, as will be described below, the response time is much quicker than for the known actuation device described above.

The actuation device of the present invention is also robust, and requires less mechanical maintenance than known devices.

BRIEF DESCRIPTION OF THE DRAWINGS

Embodiments of the invention will now be described, by way of example, with reference EO the accompanying drawings, in which.

DETAILED DESCRIPTION

Figure 1A:
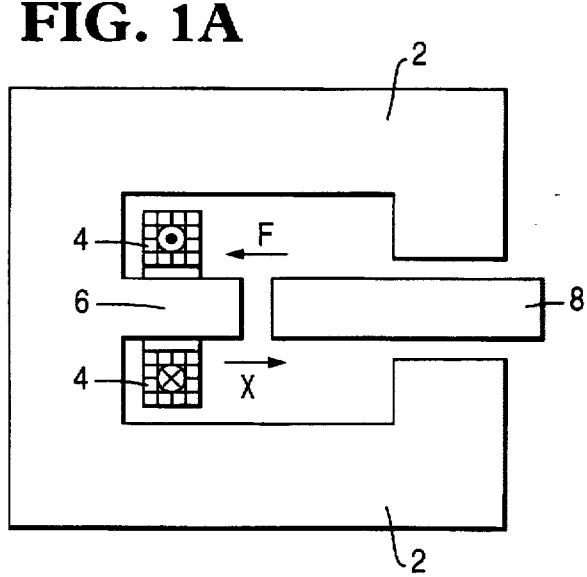
FIG. 1A is a schematic view of a portion of a known solenoid actuator.
Figure 1B:
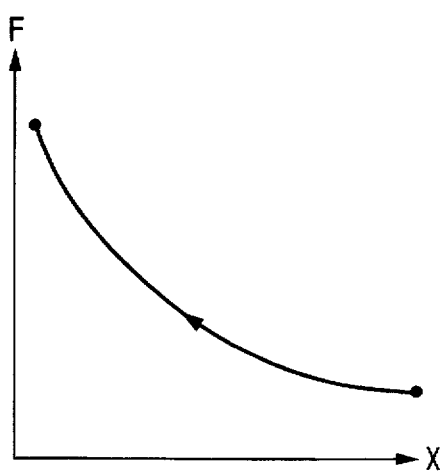
FIG. 1B is a graphic representation of the electromagnetic force acting on a magnetic armature within the solenoid actuator of FIG. 1A.

With reference to FIG. 1A there is illustrated a portion of a known solenoid actuator, the spring having been removed for clarity. The actuator contains an iron former 2 and a coil 4 of electrically conductive windings wound around a portion 6 of the iron former 2, adjacent an iron armature 8. As discussed above, when a DC current passes through the coil 4, a magnetic field is produced which in turn produces a force which urges the iron armature 8 towards the coil 4, as illustrated by the displacement/force diagram, FIG. 1B.

The coil 4 has an electrical resistance R and a large inductance L, and thus a large time constant ($t_{LR}$). Consequently, the solenoid is slow to react to the current in the coil 4 being switched on and off, so that the time between switching the current on and off and the resultant movement of the iron armature 8 is long.

Figure 2A:
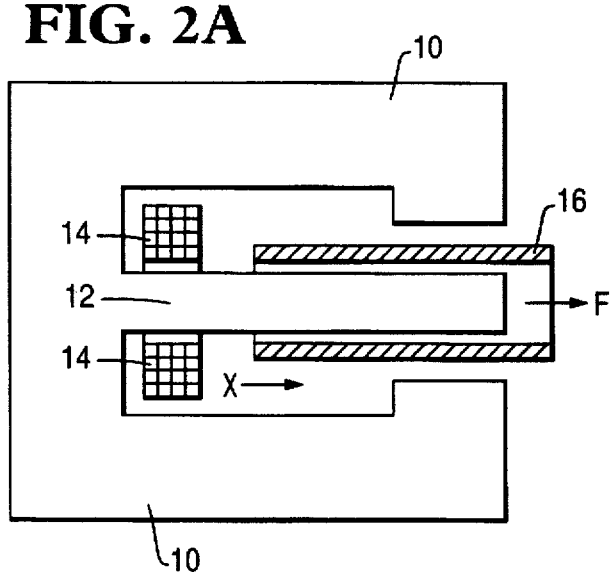
FIG. 2A is a schematic view of an actuation apparatus in accordance with the present invention, having a single actuating means.
Figure 2B:
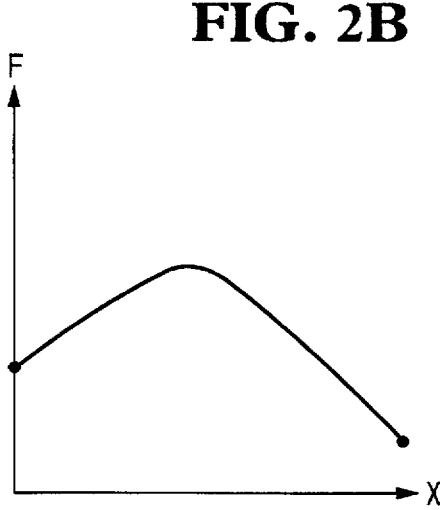
FIG. 2B is a graphic representation of the electromagnetic force acting on an electrically conductive movable member within the actuating means of FIG. 2A.

FIG. 2A is a schematic view of an actuation apparatus in accordance with the present invention. This actuation apparatus includes an iron former 10, which is similar to that used in the known solenoid actuator except that the portion 12 of the former 10 around which the coil 14 is wound has been extended. Also, the iron armature 8 of the known solenoid actuator has been replaced by a movable member 16 in the form of a hollow electrically conductive tube of copper. When an AC current from an AC voltage supply 17 (FIG. 2C) is passed through the coil 14 a magnetic field is produced. However, in this case the magnetic field in turn produces electrical eddy currents in the electrically conductive movable member 16. The action of the magnetic field on the eddy currents creates a force which urges the movable member 16 away from the coil 14, until the movable member 16 is outside the influence of the magnetic field, as illustrated in the displacement/force diagram, FIG. 2B. When the voltage supply 17 is switched off, the movable member 16 is returned to its non-actuated position by a spring (not shown).

Figure 2C:
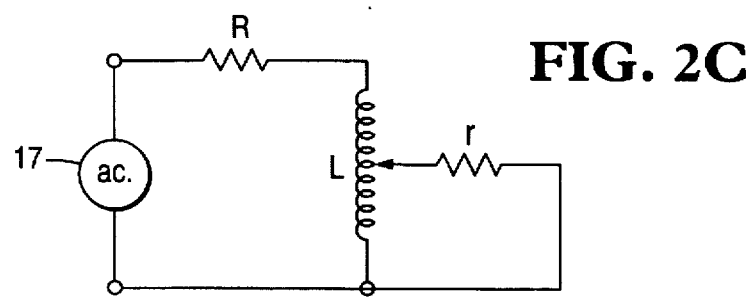
FIG. 2C is a schematic representation of the equivalent electrical circuit corresponding to the actuating means and electrically conductive movable member of FIG. 2A.

FIG. 2C illustrates an equivalent electrical circuit corresponding to the actuation apparatus, in which resistance R and inductance L correspond to the resistance and inductance of the coil 14, and resistance r corresponds to the resistance of the movable member 16. As the resistance r is in parallel with part of the inductance L, the effect of the resistance r, when a current is passed through the circuit, is to reduce the magnitude of the inductance which in turn reduces the magnitude of the time constant. Thus as the actuation apparatus in accordance with the present invention has a small time constant it will therefore react quickly to changes in the current supplied to the coil 14.

Figure 3A:
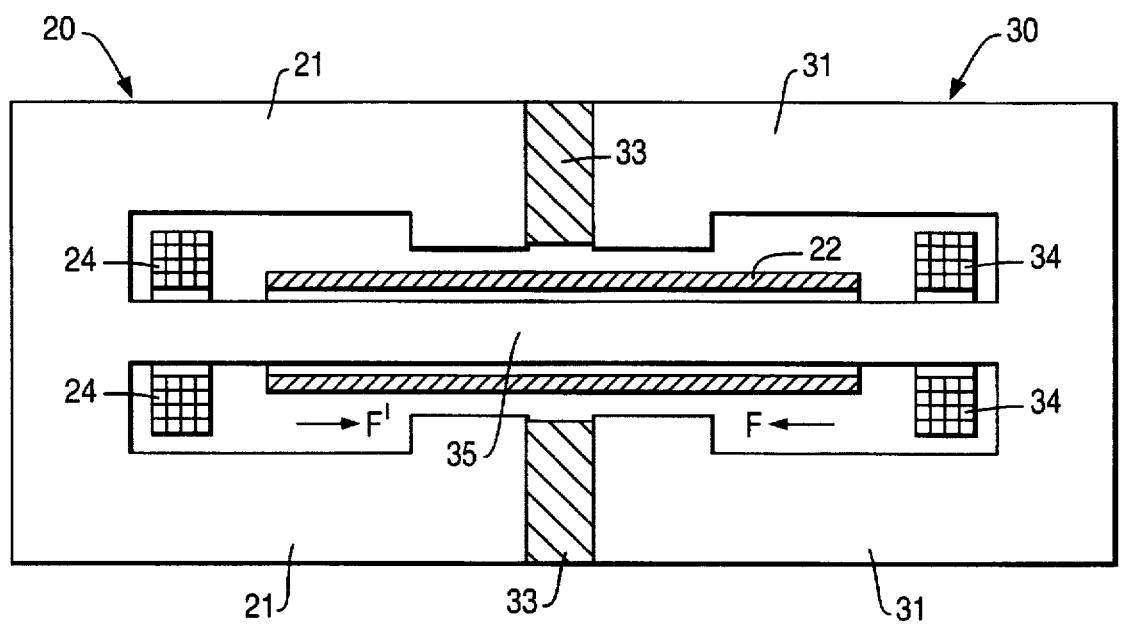
FIG. 3A is a schematic view of an actuation apparatus in accordance with the present invention having two cooperating actuating means.
Figure 3B:
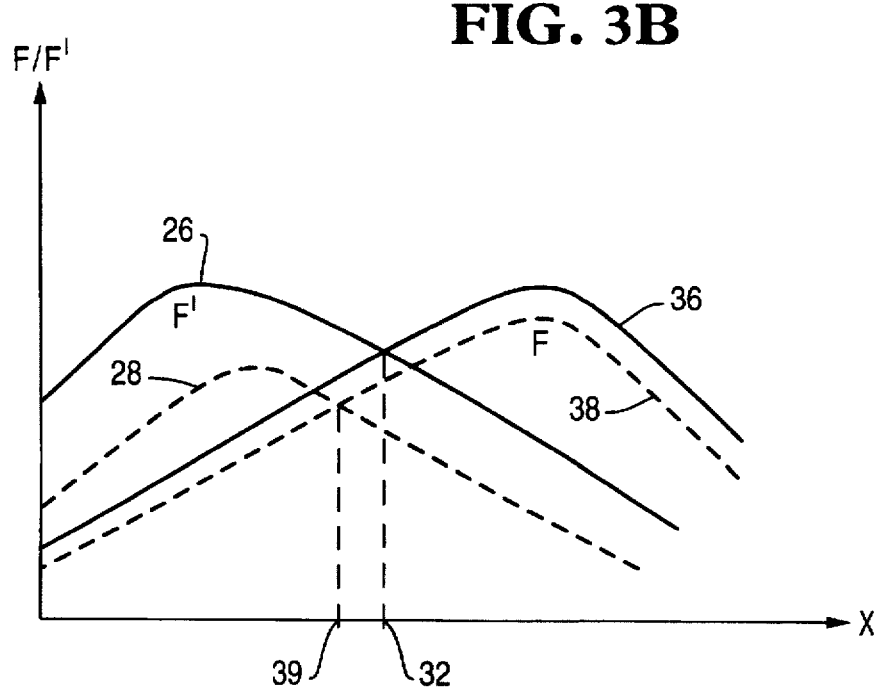
FIG. 3B is a graphic representation of the forces produced by the two actuating means of the apparatus of FIG. 3A.
Figure 4:
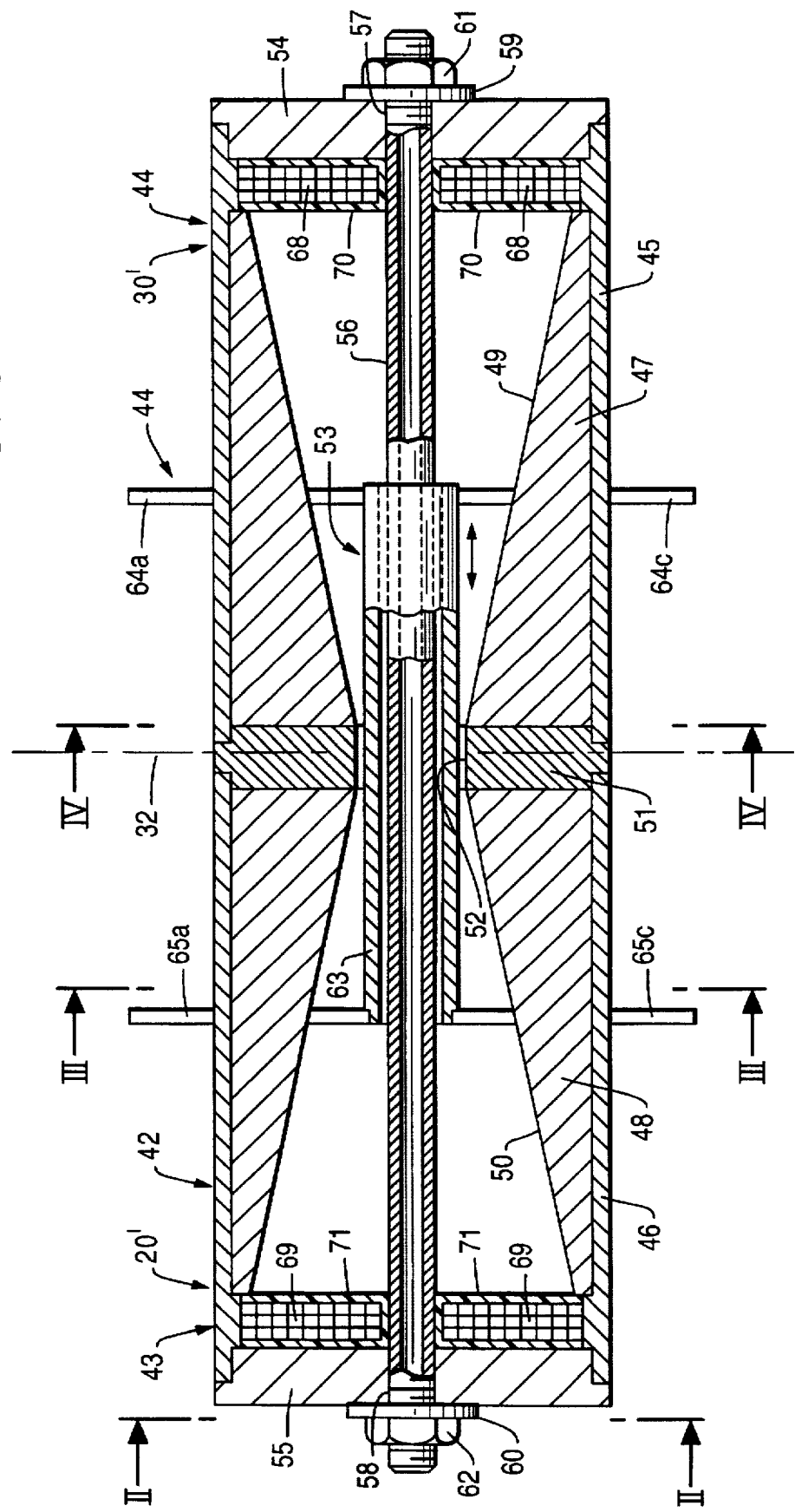
FIG. 4 is a longitudinal vertical cross-section of the main body of an actuation apparatus in accordance with the present invention.
Figure 5A:
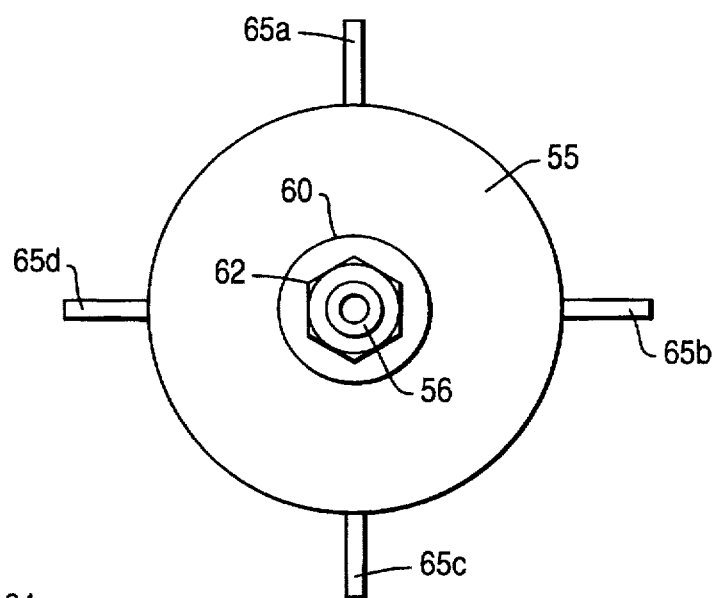
FIG. 5A is a vertical cross-section along the line II—II of FIG. 4.
Figure 5B:
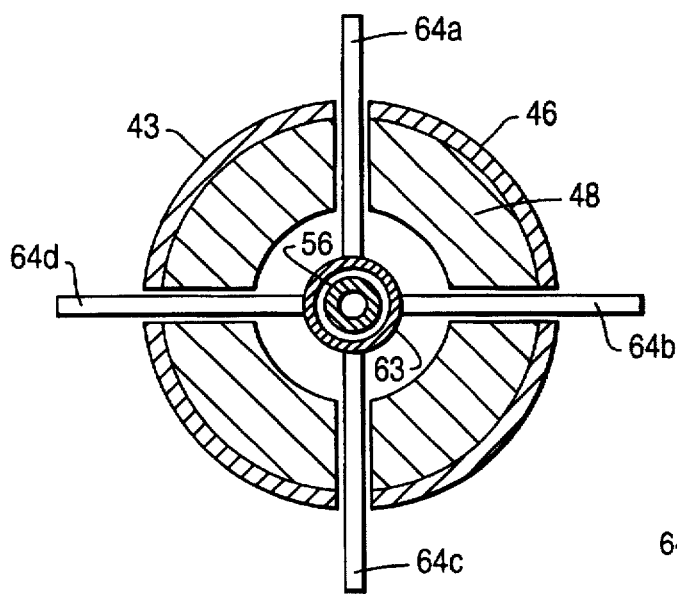
FIG. 5B is a vertical cross-section along the line III—III of FIG. 4.
Figure 5C:
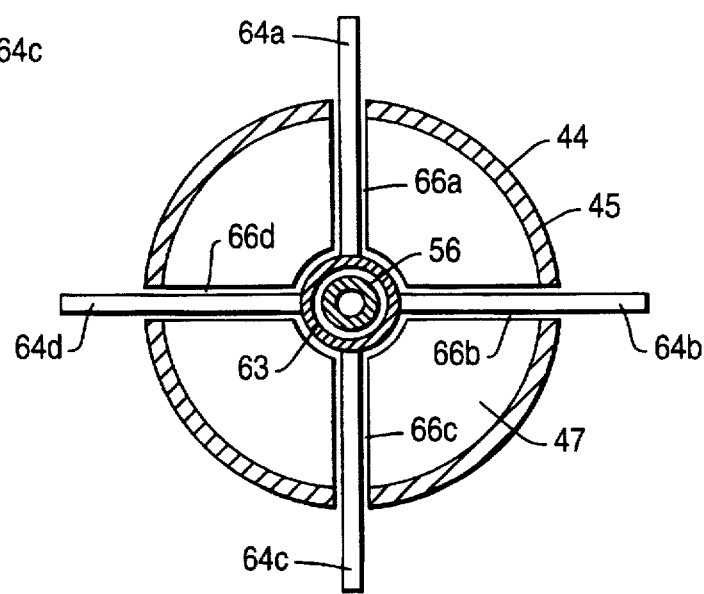
FIG. 5C is a vertical cross-section along the line IV—IV of FIG. 4.

FIG. 3A is a schematic view of an actuation apparatus in accordance with the present invention including two cooperating actuating means 20 and 30 arranged so as to urge a common movable member 22 in opposite directions when a current is supplied to each of two coils 24 and 34, as illustrated in FIG. 3B. The actuating means 20 and 30 respectively include two iron formers 21 and 31, adjacent ends of which are separated by a non-magnetic ring 33 as shown in FIG. 3A, and the interior portions of which are connected by a common central portion 35 on which is slidably mounted a cylindical movable member 22.

The full lines 26 and 36 in FIG. 3B illustrate the forces F and F' applied to the common movable member 22, when AC currents of equal magnitude are supplied to the coils 24 and 34. The forces F and F' can be seen to be equal at a point 32, and the centre of the movable member 22 is held at rest in this position by the forces F and F' produced by the actuating means 20 and 30. The dashed lines 28 and 38 illustrate the forces F and F' applied to the common movable member 22 when unequal lower currents are supplied to the coil 24 and 34. When the movable member 22 is in a fixed position, the magnitude of each force F and F' is proportional to the square of the magnitude of the current applied to the respective coil 24,34. Also, the position 39 at which these forces F and F' are equal is different, as the current supplied to the coil 24 in the actuating means 20 is less than the current supplied to the coil 34 in the actuating means 30. Thus, by supplying appropriate currents to the coils 24 and 34, the position to which the movable member 22 is moved may be selected from a continuous range of positions between the actuating means 20 and 30. It should be understood that, in operation, a current must be maintained in each of the coils 24 and 34 in order to maintain the forces F and F' on the movable member 22 and hold the movable member 22 in the position in which the forces F and F' are equal.

FIG. 4 and FIGS. 5A, 5B and 5C illustrate an embodiment of an actuation apparatus 40 in accordance with the present invention including a main outer cylindrical body 42 which, in turn, comprises two actuating means 20' and 30' in the form of two cylindrical iron structures 43 and 44 arranged laterally adjacent one another, and separated by a circular non-magnetic spacer 51 of brass; the spacer 51 having a substantially centrally located circular aperture 52. Each structure 43, 44 comprises an outer iron cylindrical tube 45, 46 enclosing an inner iron cylinder 47, 48. Each cylinder 47, 48 has a bore 49, 50 of a frusto-conical profile for most of its length; terminating at one end with a small length of substantially constant diameter. Those end portions of the two structures 43 and 44 whose bores are of constant diameter are arranged to abut the brass spacer 51, these bores being coaxial with, and being of the same diameter as, the aperture 52 of the brass spacer 51. In this way, the two bores 49, 50 are interconnected via the aperture 52 to define an internal cavity 53 for the cylindrical body 42. The internal cavity 53 is bounded by two end plates 54 and 55 one at each end of the cylindrical body 42. A hollow iron support rod 56 runs longitudinally through the internal cavity 53 and through apertures 57 and 58 provided in the end plates 54 and 55. The constituent parts 45, 46, 47, 48, 54, 55 of the iron structures 43 and 44 are held together, and the hollow support rod 56 is held in place, by washers 59 and 60 and nuts 61 and 62 screwed in place around threaded end portions of the hollow rod 56, the washers 59 and 60 bearing against the outer surfaces of the end plates 54 and 55.

A copper tube 63 is concentrically mounted around, and supported by, the hollow support rod 56 within the internal cavity 53. The copper tube 63 is arranged to be laterally slidably movable along the supporting rod 56 as indicated by the arrows in FIG. 4. Secured to each end of the copper tube 63 is a set of four substantially equidistantly spaced, radially extending, metal spokes 64a–d; 65a–d. The spokes 64a–d; 65a–d respectively extend radially through slits 66a–d; 67a–d provided in the outer tubes 45 and 46 and inner cylinders 47 and 48 so as to protrude externally of the cylindrical body 42.

Figure 6:
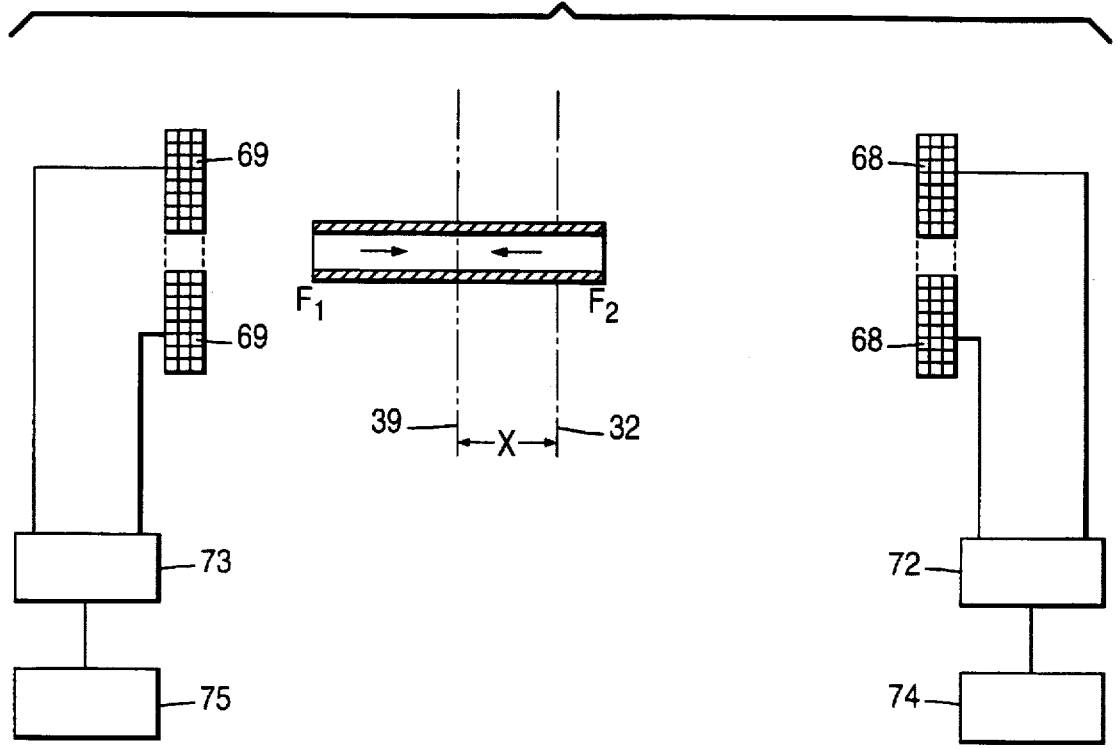
FIG. 6 is a schematic illustration of the operation of the actuation apparatus of FIG. 4.

Two coils 68 and 69 of the type well known in electromagnetic applications, are provided inside the cylindrical body 42. The coils 68 and 69 are wound on formers 70 and 71 which are mounted on the supporting rod 56, and which are respectively located in juxtaposition with the inner faces of the end plates 54 and 55. The copper tube 63 is therefore movable in a direction parallel to the axes of the two coils 68 and 69. Each coil 68 and 69 is coupled to a separate variable single phase AC voltage supply 72, 73, as illustrated schematically in FIG. 6. For clarity, these connections are not shown in FIG. 4, but are of the kind well known to persons skilled in the art.

Typically, the outer cylindrical body 42 has a length of 20 cm, and an outer diameter of 6 cm. The copper tube 63, is typically approximately 7 cm in length with an external diameter of approximately 2.5 cm.

By respectively applying voltages $V_1$ and $V_2$ simultaneously to the respective coils 68 and 69, two opposing forces $F_1$ and $F_2$ act upon the copper tube 63 by virtue of the interaction between the eddy currents induced in the tube 63 and the magnetic fields produced by the coils 68 and 69. As illustrated schematically in FIG. 6, the centre of the copper tube 63 will be displaced a distance X from a central location 32 of the apparatus 40, the tube 63 being positioned at a location 39 where the forces $F_1$ and $F_2$ acting on the tube 63 are equal. By independently controlling the magnitude of the voltages $V_1$ and $V_2$ applied to the coils 68 and 69, it is possible to select the magnitude and the direction of the displacement X of the tube 63. It is therefore possible, by carefully selecting the voltages $V_1$ and $V_2$, to position the tube 63 at any desired location along a length defined by the dimensions of the actuation apparatus 40. The cylindrical structures 43 and 44 respectively provide flux paths, for the associated coils 68 and 69, with the brass spacer 51 acting to separate the two structures 43 and 44 magnetically.

The voltages $V_1$ and $V_2$ applied to the respective coils 68 and 69 are controlled by varying the firing delay angle of respective triacs (not shown) provided in the respective control circuits 74 and 75 coupled to the coils 68,69.

It should be understood that, if desired, only one of the voltages $V_1$ and $V_2$ could be arranged to be variable, with the other voltage being arranged to be of constant magnitude.

Figure 7:
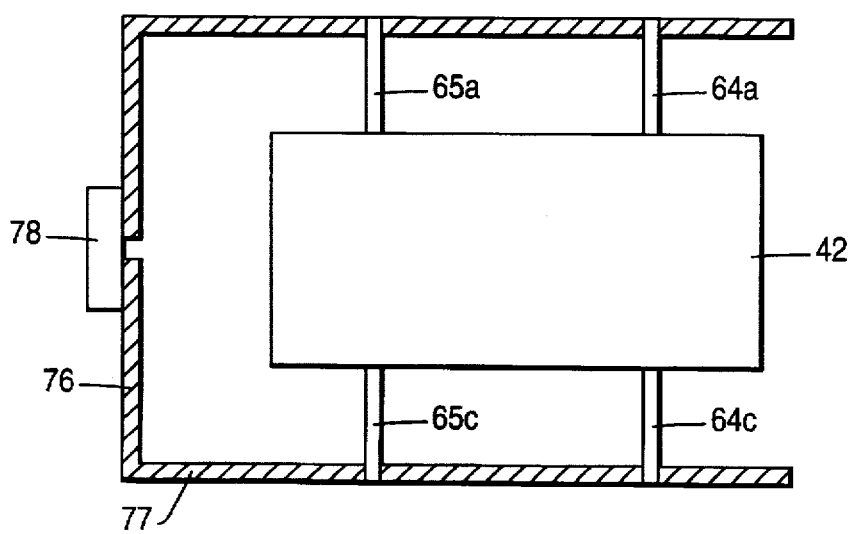
FIG. 7 illustrates the mounting of a workpiece on the actuation apparatus of FIG. 4.

FIG. 7 illustrates how the actuation apparatus 40 is used to selectively position a workpiece 78. The workpiece 78 is mounted on a mounting plate 76 of an outer cylindrical chassis 77, coupled to the radial spokes 64a–d; 65a–d of the actuation apparatus 40. As the copper tube 63 is displaced by varying the voltages $V_1$ and $V_2$ to the respective coils 68 and 69 as described above, the radial spokes 64a–d; 65a–d are also laterally displaced, and consequently the outer chassis 77 is also displaced, thus moving the mounted workpiece 78 a corresponding distance.

It will be understood by a person skilled in the are that various modifications are possible within the scope of the present invention. For example, the radial spokes 64a–d; 65a–d can be attached to other shaped housings and workpiece mounts depending on the proposed application of the actuation device. Also, the voltages $V_1$ and $V_2$ can be controlled in other ways, again depending on the proposed application. For example, they may be controlled by signal processing hardware and software.

We claim:

1. An apparatus for positioning a workpiece, said apparatus comprising:

a movable member connectable to the workpiece;

energizable first electromagnetic actuating means for, when energized, producing a first force which acts on said movable member in a first direction;

energizable second electromagnetic actuating means for, when energized, producing a second force which acts on said movable member in a second direction which is opposite to said first direction;

said first and second forces being (i) dependent upon the position of said movable member relative to said first and second actuating means and (ii) equal when said movable member is moved to a desired position by appropriate energization of said first and second actuating means;

said first and second coils being respectively associated with first and second coaxial cylindrical members which provide magnetic flux paths for said coils and which are separated by a non-magnetic spacer, said movable member being movable in a direction parallel to the axes of said first and second cylindrical members;

said first and second cylindrical members forming a housing having an internal cavity and openings, said movable member being mounted in said internal cavity in said housing;

mounting means for mounting the workpiece thereon; and coupling means extending through said openings in said housing and for connecting said movable member to said mounting means.

2. An apparatus for positioning a workpiece, said apparatus comprising:

a movable member connectable to the workpiece;

energizable first electromagnetic actuating means for, when energized, producing a first force which acts on said movable member in a first direction;

energizable second electromagnetic actuating means for, when energized, producing a second force which acts on said movable member in a second direction which is opposite said first direction;

said first and second forces being (i) dependent upon the position of said movable member relative to said first and second actuating means and (ii) equal when said movable member is moved to a desired position by appropriate energization of said first and second actuating means; and a support rod, said movable member including a hollow cylinder slidably mounted on said support rod.

3. An apparatus for positioning a workpiece, the apparatus comprising:

a tubular movable member connectable to the workpiece and comprising electrically conductive material; and an energizable electromagnetic actuating device for, when energized, producing a magnetic field which induces eddy currents in the movable member, the eddy currents induced in the movable member and the magnetic field produced by the actuating device interacting to produce a force which acts on the movable member in a predetermined direction to position the workpiece.

4. An apparatus according to claim 3, wherein the energizable electromagnetic actuating device includes an energizable solenoid actuator having (i) an iron former, and (ii) a coil of electrically conductive windings wound around at least a portion of the iron former.

5. An apparatus according to claim 3, wherein the electrically conductive material of the tubular movable member includes copper.

6. An apparatus for positioning a workpiece, the apparatus comprising:

a tubular movable member connectable to the workpiece and comprising electrically conductive material;

an energizable first electromagnetic actuating device for, when energized, producing a first force which acts on the movable member in a first direction; and an energizable second electromagnetic actuating device for, when energized, producing a second force which acts on the movable member in a second direction which is opposite to the first direction;

the first and second forces being (i) dependent upon the position of the movable member relative to the first and second actuating devices, and (ii) equal when the movable member is moved to a desired position by appropriate energization of the first and second actuating devices.

7. An apparatus according to claim 6, wherein at least one of the first and second actuating devices is variably energizable to allow variable positioning of the tubular movable member.

8. An apparatus according to claim 6, wherein the electrically conductive material of the tubular movable member includes copper.

9. An apparatus for positioning a workpiece, said apparatus comprising:

a movable member connectable to the workpiece;

energizable first electromagnetic actuating means for, when energized, producing a first force which acts on said movable member in a first direction; and energizable second electromagnetic actuating means for, when energized, producing a second force which acts on said movable member in a second direction which is opposite to said first direction;

said first and second forces being (i) dependent upon the position of said movable member relative to said first and second actuating means, and (ii) equal when said movable member is moved to a desired position by appropriate energization of said first and second actuating means;

said first and second actuating means including respective first and second coils which are connectable to respective separate AC voltage supplies, said movable member being electrically conductive, each of said first and second forces being caused by the interaction of eddy currents induced in said movable member with the magnetic field produced by the respective coil.

10. An apparatus according to claim 9, wherein said first and second coils are respectively associated with first and second coaxial cylindrical members which provide magnetic flux paths for the said coils and which are separated by a non-magnetic spacer, said movable member being movable in a direction parallel to the axes of said first and second cylindrical members.

11. An apparatus according to claim 10, wherein said first and second cylindrical members form a housing having an internal cavity and openings, said movable member being mounted in said internal cavity in said housing.

* * * * *